United States Patent [19]

Shupe et al.

[11] 4,077,471
[45] Mar. 7, 1978

[54] SURFACTANT OIL RECOVERY PROCESS USABLE IN HIGH TEMPERATURE, HIGH SALINITY FORMATIONS

[75] Inventors: Russell D. Shupe; Jim Maddox, Jr., both of Houston, Tex.

[73] Assignee: Texaco Inc., New York, N.Y.

[21] Appl. No.: 746,641

[22] Filed: Dec. 1, 1976

[51] Int. Cl.$^2$ .................. E21B 43/22; E21B 43/24
[52] U.S. Cl. .................. 166/275; 166/272; 252/855 D
[58] Field of Search ............ 166/252, 273, 274, 275, 166/305 R, 272, 303; 252/8.55 D

[56] References Cited

U.S. PATENT DOCUMENTS

| | | | |
|---|---|---|---|
| 3,508,612 | 4/1970 | Reisberg et al. | 166/274 |
| 3,739,848 | 6/1973 | Lawson et al. | 166/274 |
| 3,799,264 | 3/1974 | Cardenas et al. | 166/275 |
| 3,811,504 | 5/1974 | Flournoy et al. | 166/273 |
| 3,811,505 | 5/1974 | Flournoy et al. | 166/273 X |
| 3,811,507 | 5/1974 | Flournoy et al. | 166/274 |
| 3,827,497 | 8/1974 | Dycus et al. | 166/274 |
| 3,858,656 | 1/1975 | Flournoy et al. | 166/274 |
| 3,890,239 | 6/1975 | Dycus et al. | 166/275 X |
| 3,977,471 | 8/1976 | Gale et al. | 166/273 |

*Primary Examiner*—Stephen J. Novosad
*Assistant Examiner*—George A. Suchfield
*Attorney, Agent, or Firm*—Carl G. Ries; Thomas H. Whaley; Jack H. Park

[57] ABSTRACT

Many petroleum formations contain water having high salinity and/or high concentrations of divalent ions such as calcium or magnesium dissolved therein, and are additionally at temperature from about 70° F. to about 300° F. Most surfactants suitable for use in oil recovery operations are either ineffective in high salinity or high hardness waters, or cannot tolerate the higher temperatures encountered in many such formations. An aqueous fluid containing a water soluble alkylpolyalkoxyalkyl sulfonate or alkylarylpolyalkoxyalkyl sulfonate and a water-insoluble polyethoxylated aliphatic alcohol or polyethoxylated alkylphenol nonionic surfactant is effective in formations containing water whose salinity is from 70,000 to 220,000 parts per million total dissolved solids and also having temperatures as high as 300° F. The fluid is phase stable over a wide range of formation temperatures and water salinities and hardness values.

19 Claims, No Drawings

4,077,471

SURFACTANT OIL RECOVERY PROCESS USABLE IN HIGH TEMPERATURE, HIGH SALINITY FORMATIONS

CROSS REFERENCE TO RELATED APPLICATIONS

This application is related to copending application Ser. No. 526,780 filed Nov. 25, 1974, now Pat. No. 4,018,278 for Surfactant Oil Recovery Process for High Temperature Formations.

BACKGROUND OF THE INVENTION

1. Field of the Invention

This invention concerns an oil recovery process and more specifically a surfactant flooding oil recovery process. Still more specifically, this invention is concerned with an oil recovery process using an aqueous fluid containing a water soluble alkylpolyalkoxyalkyl sulfonate or alkylarylpolyalkoxyalkyl sulfonate anionic surfactant and a water insoluble ethoxylated nonionic surfactant, which fluid is phase stable and suitable for flooding formations containing high concentrations of salt and/or divalent ions such as calcium and magnesium, which formations additionally have temperatures in the range of from about 70° to about 300° F.

2. Description of the Prior Art

Petroleum is normally recovered from subterranean formations in which it has accumulated, by penetrating the formation with one or more wells and pumping or permitting the petroleum to flow to the surface through these wells. Recovery of petroleum from formations is possible only if certain conditions exist in the formations. The petroleum should be present in the formation in an adequately high concentration, and there must be sufficient permeability or interconnected flow channels within the formation to permit the flow of fluids therethrough if sufficient pressure is applied to the fluid. When the formation has natural energy present in the form of an underlying active water drive, or gas dissolved in the petroleum which can exert pressure to drive the petroleum to the producing well, or a high pressure gas cap above the petroleumsaturated portion of the formation, this natural energy is ordinarily utilized first to recover petroleum. Recovery of petroleum in this manner using natural energy is ordinarily referred to as primary recovery. When this natural energy source is depleted, or in the instance of those formations which do not contain sufficient natural energy initially to support primary recovery, some form of supplemental or enhanced recovery process must be applied to the formation in order to extract petroleum therefrom. Supplemental recovery is sometimes referred to as secondary or tertiary recovery, although in fact it may be primary, secondary or tertiary in sequence of employment.

Waterflooding, which involves the injection of water into the subterranean, petroleum-containing formation for the purpose of displacing petroleum toward the producing well, is the most economical and widely practiced supplemental recovery method. Water does not displace petroleum efficiently, however, since water and oil are immiscible and also because the interfacial tension between water and oil is quite high. Persons skilled in the art of oil recovery have recognized this limitation of waterflooding and many additivies have been described in the literature for incorporation in the flooding water to reduce the interfacial tension between the injected water and the formation petroleum. U.S. Pat. No. 2,233,381 (1941) discloses the use of polyglycol ethers as surface active agents or surfactants to increase the capillary displacement efficiency of an aqueous flooding medium. U.S. Pat. No. 3,302,713 discloses the use of petroleum sulfonates prepared from specified boiling range fractions of petroleum feedstock as a surfactant in surfactant flooding supplemental oil recovery operations. Other surfactants which have been proposed for oil recovery operations include alkylpyridinium salts, alkyl sulfates, alkylaryl sulfates, ethoxylated alkyl or alkylaryl sulfates, alkyl sulfonates, alkylaryl sulfonates, and quaternary ammonium salts.

The above described surfactants are satisfactory in certain limited applications, particularly in formations containing water whose salinity and hardness, i.e. concentration of divalent ions including calcium and magnesium, is relatively low. For example, when the salinity of the formation water is less than about 30,000 parts per million and the concentration of divalent ions is less than about 200 to about 500 parts per million, petroleum sulfonates are very effective. U.S. Pat. Nos. 3,792,731; 3,811,504; 3,811,505; and 3,811,507 describe oil recovery processes employing specified mixtures of water soluble anionic and water soluble nonionic surfactants which exhibit satisfactory performance in petroleum formations containing water having high concentrations of divalent ions, i.e. in the concentration range of from about 500 to 18,000 parts per million calcium and magnesium.

U.S. Pat. No. 3,508,612 describes an oil recovery method using an aliphatic polyethoxy sulfate and an organic sulfonate. U.S. Pat. No. 3,888,308 describes the use of an aqueous solution of an alkyl or alkylpolyethoxy sulfate as a mobility buffer. U.S. Pat. No. 3,827,497 and 3,890,239 describe an oil recovery process and a fluid containing the organic sulfonate and an alkylpolyethoxy sulfonate. U.S. Pat. No. 3,977,471 describes an oil recovery process and a fluid employing an alkylarylpolyalkoxyalkyl sulfonate in single surfactant mode.

While these mixtures effectively increase the salinity concentration range of surfactant flooding, the higher salinities and higher concentration ranges of calcium and magnesium often involve the use of a sulfated, ethoxylated surfactant which is not stable at temperatures higher than about 125° to 150° F, because of the tendency for the sulfated ethoxylated compounds to hydrolyze. Unfortunately, many subterranean petroleum formations are known which contain water having high salinity and/or high concentrations of divalent ions such as calcium and/or magnesium, and additionally are at higher temperatures than 125° to 150° F.

It is desirable that the surfactant fluid viscosity by at least slightly greater than the crude oil present in the formation to ensure effective volumetric displacement. Hydrophilic polymeric materials such as polyacrylamides and polysaccharides are commonly used for forming a viscous fluid separate from the surfactant fluid to be injected after the surfactant fluid. Certain surfactants are incompatible with the common polymers, however, and there is a risk of phase instability in the use of these polymers in the same fluid as contains otherwise desirable surfactants.

In view of the foregoing discussion, it can be appreciated that there is a substantial, unfulfilled commercial need for a surfactant oil recovery method using a phase stable surfactant fluid, preferably a viscous fluid which can be injected into formations whose temperatures are in excess of 125° F., which formations also contain water having salinities higher than about 30,000 parts per million total dissolved solids, and/or conentrations of divalent ions greater than about 2,000 parts per million.

SUMMARY OF THE INVENTION

The present invention concerns an oil recovery process suitable for use in formations whose temperatures are from 70° F to 300° F, which formations may also contain water having high salinity and/or high hardness, e.g. salinities from 70,000 to 220,000 parts per million total dissolved solids which may include concentrations of divalent ions greater than about 2,000 parts per million. The oil recovery process involves injecting into the formation, an aqueous solution containing at least the following two components.

1. An alkylpolyalkoxyalkyl sulfonate or alkylarylpolyalkoxyalkyl sulfonate having the following structural formula:

$$RO(R'O)_xR''SO_3^-M^+$$

wherein R is a linear or branched aliphatic, alkyl or alkylaryl radical, having from 8 to 24 carbon atoms in the alkyl chain and preferably from 12 to 20 carbon atoms in the alkyl chain, R' is ethyl or a mixture of ethyl and propyl with relatively more ethyl than propyl, R'' is ethyl, propyl, hydroxypropyl or butyl, $x$ is an integer from 1 to 20 and preferably from 2 to 8, and $M^+$ is a monovalent metallic cation such as sodium, potassium, or lithium, or an ammonium ion.

2. A water insoluble nonionic surfactant, which is an ethoxylated aliphatic alcohol or ethoxylated alkylphenol having the following structure:

$$R'''O(CH_2CH_2O)_yH$$

wherein R''' is the same as R and y is an integer whose value is from $(x-3)$ to $(x+3)$ and preferably from $(x-2)$ to $x$.

In certain applications, it is preferred that these two surfactants, be the principal or sole surface active agents present in the surfactant fluid. In other applications these two materials may be utilized in combinations with other surface active agents such as petroleum sulfonates, alkyl sulfonates or alkylaryl sulfonates, etc. Certain combinations of these two surfactants also result in a viscous fluid.

DESCRIPTION OF THE PREFERRED EMBODIMENTS

The earliest and simplest forms of surfactant flooding employed an aqueous solution containing a sole primary anionic surfactant, generally a petroleum sulfonate, which is effective only in formations containing relatively low salinity water, e.g. formation water whose salinity is less than about 30,000 parts per million total dissolved solids, and having less than about 200 to about 500 parts per million divalent ions such as calcium and magnesium dissolved therein. Since many formations are known which contain appreciable amounts of unrecoverable oil otherwise suitable for surfactant flooding, which also contain water having salinities greater than 30,000 parts per million total dissolved solids, and more than 500 parts per million divalent ions dissolved therein, some modificiation of this relatively simple flooding procedure was required to permit application of surfactant flooding technology to the great bulk of petroleum reservoirs known to exist. Two basic approaches have evolved in the art, one of which requires that the high salinity formation water be first displaced from the formation by pre-flushing the formation with fresh water to ensure that the water present in the formation when the surfactant is injected is sufficiently fresh that a petroleum sulfonate can be utilized, or the use of a combination of surfactants comprising a petroleum sulfonate or some other organic sulfonate as the primary anionic surfactant and a solubilizer such as an alcohol or a solubilizing co-surfactant such as a water soluble nonionic surfactant, e.g. a polyethoxylated alcohol or alkylphenol, or an alkylpolyethoxy sulfate or alkylarylpolyethoxy sulfate, or an alkylpolyethoxyalkyl sulfonate or alkylarylpolyethoxyalkyl sulfonate.

Pre-flushing the formation with fresh water has usually not successfully reduced the salinity of the formation water in all portions of the formation through which the surfactant solution will travel.

It has been discovered that certain materials which can be utilized as solubilizing co-surfactants, notably the alkylpolyethoxy sulfate or alkylarylpolyethoxy sulfate, or the alkylpolyalkoxyalkyl sulfonate or alkylarylpolyalkoxyalkyl sulfonate can be utilized as a single surfactant i.e., without petroleum sulfonate or other organic sulfonate for oil recovery purposes in high salinity solutions. These materials appear especially attractive because they are effective in the high salinity ranges in which most primary anionic surfactants such as petroleum sulfonate are not effective, e.g. in the range of from about 70,000 to about 220,000 parts per million total dissolved solids, but also the alkylpolyalkoxyalkyl sulfonate or alkylarylpolyalkoxyalkyl sulfonates are temperature stable whereas many nonionic surfactants such as ethoxylated alcohols or ethoxylated alkylphenols as well as alkylpolyethoxy sulfates or alkylarylpolyethoxy sulfates either become insoluble or hydrolyze at formation temperatures substantially in excess of about 125° F.

The use of a single surfactant fluid containing as a sole surface active agent, an alkylpolyalkoxyalkyl sulfonate or alkylarylpolyalkoxyalkyl sulfonate appears to exhibit one unexpected problem. Fluids prepared using this surfactant in high salinity environments sometimes exhibit phase instability. The fluids, when mixed in the desired concentration ranges, separate into two phases, which render the use of such materials ineffective and possibly hazardous to the formation, since injection of such phase unstable fluids into the formations causes ineffective oil displacement and may lead to plugging of small flow channels in a permeable oil formation. The cause of phase instability is not well understood and does not always occur.

We have discovered that the use of a water insoluble nonionic surfactant, specifically a polyethoxylated aliphatic compound such as a polyethoxylated alkanol, linear or branched, or a polyethoxylated alkylaryl compound such as a polyethoxylated alkylphenol results in achieving sufficient phase stabilization of the high salinity fluid containing the aliphatic polyalkoxylalkyl sulfonate or alkylarylpolyalkoxyalkyl sulfonate sufficiently to permit its use in high salinity, high temperature environments, e.g. in formations whose temperature is from 70° F to 300° F and which contain water whose salinity is from 70,000 to 220,000 parts per million total dissolved solids. The effectiveness of the water insoluble nonionic surfactant is particularly surprising, since water soluble nonionic surfactants such as are taught in the prior art for use in oil recovery processes, are not effective for this purpose, whereas the water insoluble nonionic surfactants are effective. Water solubility of a nonionic surfactant is determined by the balance between the number of water soluble ethylene oxide groups and the length of the oil soluble alkyl chain in the alkyl or alkylaryl portion of the surfactant molecule. A water insoluble nonionic surfactant which can be used in process may differ from a water soluble nonionic such as is taught in the prior art but which will not work in our process, only in that the water insoluble nonionic surfactant will have from one to six fewer moles of ethylene oxide per mole of surfactant than a related water soluble nonionic surfactant.

The specific fluid utilized in the oil recovery process of our invention comprises an aqueous solution containing:

(1) From about .05 to about 10.0 and preferably from about .1 to about 5.0 percent by weight of an anionic surfactant having the following general formula:

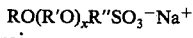
$RO(R'O)_xR''SO_3^-Na^+$ wherein
  R is an aliphatic radical such as an alkyl group, branched or straight chain, or an alkylaryl group such as benzene, toluene or xylene having attached thereto a linear or branched alkyl chain having from 8 to 24 and preferably from 12 to 20 carbon atoms in the alkyl chain,
  R' is ethyl or a mixture of ethyl and propyl with relatively more ethyl than propyl,
  x is an integer from 1 to 20 and preferably from 2 to 8,
  R'' is ethyl, propyl, hydroxypropyl or butyl, and
  M+ is a monovalent cation such as ammonium or a monovalent metallic cation including sodium, potassium, and lithium. For example, a preferred surfactant for use is one in which R is a mixture of aliphatics having from 16 to 18 carbon atoms, R' is ethyl, x is 5, R'' is ethyl, and M+ is sodium.

(2) From 0.05 to 10.0 and preferably from 0.10 to 5.0 percent by weight of a phase-stabilizing additive, which is a water insoluble nonionic surfactant having the following general structure:

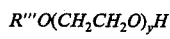
$R'''O(CH_2CH_2O)_yH$ wherein R''' is an aliphatic radical including an alkyl group linear or branched, or alkylaryl, having from 8 to 24 carbon atoms and preferably from 12 to 20 carbon atoms in the aliphatic or alkyl chain and y is an integer from 1 to 10 and preferably from 2 to 6. Ordinarily once the value of x in the alkylpolyalkoxyalky sulfonate or alkylarylpolyalkoxyalkyl sulfonate is known, the value of y for a nonionic surfactant having the same or an equivalent oil soluble group should be from $(x-3)$ to $(x+3)$ and is preferably from $(x-2)$ to $x$. For example, an ethoxylated straight chain aliphatic alcohol having from 16 to 18 carbon atoms in the aliphatic chain and containing an average of 4 ethoxy groups per molecule is a preferred water insoluble, nonionic surfactant phase stabilizing additive for use in combination with the $C_{16-18}$ alkylpentaethoxyethyl sulfonate described above.

The above described two component system is utilized in a subterranean formation containing relatively high salinity water, e.g. water having a salinity in the range of from about 70,000 to about 220,000 parts per million total dissolved solids, which may include from about 3,000 to about 15,000 parts per million polyvalent ions such as calcium or magnesium, the temperature of the formation being from 70° F to 300° F.

In another embodiment, the surfactant fluid may contain, in addition to the two surfactants described above, from 0.1 to 10.0 and preferably from 0.5 to 5.0 percent by weight of a water soluble organic sulfonate such as a petroleum sulfonate, an alkyl sulfonate or an alkylaryl sulfonate.

In preparing a fluid for use in a subterranean formation according to the process of our invention, the first step requires that the optimum alkylpolyalkoxyalkyl sulfonate or alkylarylpolyalkoxyalkyl sulfonate and the water insoluble nonionic surfactant for the particular aqueous environment in which it must function be identified. The operable materials must be identified by preparing fluids containing both the alkylpolyalkoxyalkyl sulfonate or alkylarylpolyalkoxyalkyl sulfonate and the alkylpolyethoxy or alkylarylpolyethoxy nonionic surfactants having the same salinity and divalent ion concentration as the water in the formation in which they are to be used, and noting whether the fluids are phase stable for at least 7 days at a temperature about equal to the temperature of the formation into which they are to be injected. If the fluids are not phase stable, no further tests are needed since they will not be effective for oil recovery. If they are phase stable, surfactant effectiveness should be determined by measuring interfacial tension or other appropriate measurements at the formation temperature. The interfacial tension should be less than $1 \times 10^{-2}$ and preferably less than $5 \times 10^{-3}$ dynes per centimeter. Based on the results obtained, additional tests may be needed on fluids prepared using surfactants having one or two fewer and/or additional ethylene oxide units per molecule. As a guideline, in formation brines having salinities around 200,000 parts per million total dissolved solids including 10,000 parts per million divalent ions, either of the following systems should be effective at a temperature of about 240° F.

A. Dodecylphenolhexaethoxyethyl sulfonate plus the six mole ethylene oxide adduct of dodecylphenol.

B. $C_{16}$ - $C_{20}$ linear alkylpentaethoxyethyl sulfonate plus the five mole ethylene oxide adduct of a $C_{16}$ - $C_{20}$ linear alkanol.

The number of ethoxy groups per molecule of each surfactant may be reduced by 1–3 for use in 150,000 parts per million salinity brine. These values should be considered as starting points, however, and the final preferred species should be identified by trial and error, varying the number of ethoxy groups by + or − 1 or 2. Also, the effect of concentration should be determined by examining fluids having concentrations of at least 0.5, to 2.0 percent by weight of the sulfonate, with the concentration of nonionic surfactant being from 10–60 percent and preferably from 20–40 percent of the concentration of the sulfonate.

In the foregoing tests, phase stability is determined by mixing the fluids, storing them in quiescent state for at least 7 days at the temperature of the formation in which they are to be used. The samples are observed visually during this period to determine the number of days they are phase stable. Phase instability is noted by the presence of two separate phases, which may be distinct or there may be only a thin layer of surfactant visible near the top of the fluid.

We have found that it is not essential that the alkyl or alkylaryl portion of the nonionic surfactant be the same as the alkyl or alkylaryl portion of the ethoxylated sulfonate. We have observed stabilization of surfactant fluids by the use of ethoxylated alkanols with alkylarylpolyalkoxyalkyl sulfonate as well as with the use of ethoxylated alkylphenols with alkylpolyalkoxyalkyl sulfonates as well as when alkyl compounds are used together or when alkylaryl compounds are used together. Ordinarily, the number of ethoxy groups per molecule should be roughly the same, although slightly less or more have also been found to be acceptable. The number of ethoxy groups per molecule in the nonionic may be up to 3 more or less than and is preferably from two less than to the same as the number of ethoxy groups per molecule in the sulfonate. The concentration of the nonionic phase stabilizing additive will be from about 10 to about 60 percent and preferably 20–40 percent of the concentration of the sulfonated ethoxylated aliphatic compound.

If the surfactants are phase stable at or near the formation temperature and phase unstable at surface ambient temperature, the fluid should be heated to a temperature near the formation temperature prior to injecting it into the formation.

Application of the above-described fluid for oil recovery will otherwise utilize state-of-the-art surfactant flooding procedures. From .05 to 5.0 and preferably from 0.1 to 1.0 pore volume of surfactant fluid will be injected into the formation. Sacrificial agents to prevent adsorption of surfactant may be injected before and/or with the surfactant fluid. From 100 to 1500 parts per million hydrophilic polymer such as polyacrylamide or polysaccharide may be included in the surfactant fluid and/or in an aqueous slug injected after the surfactant fluid for mobility control, if the temperature of the formation permits use of polymers and if no adverse interaction occurs between the polymer and surfactant.

EXPERIMENTAL SECTION

For the purpose of demonstrating the method of identifying the preferred embodiments of the process of our invention and further to demonstrate the degree of stabilization and oil recovery effectiveness achieved as a result of application of the process of our invention, the following experimental work was performed.

In the course of designing a surfactant flooding process for use in an oil-containing formation whose temperature is 240° F., and which formation contains water having a salinity of 205,000 parts per million total dissolved solids including about 10,000 parts per million divalent ions, principally calcium and magnesium, a preferred primary surfactant was identified which was a sodium salt of an alkylpolyethoxyethyl sulfonate in which the alkyl chain was a mixture of from 16 to 20 carbon atoms, available commercially under the trade name Alfol ® sold by Conoco Chemical Company, and having 5 moles of ethylene oxide per mole of surfactant. It was further determined that the optimum concentration of this surfactant was 2 percent by weight.

A sample was prepared in the oil field brine, containing 2 percent by weight of the above-identified surfactant, and was stored at 240° F. for one week. Daily observation of the fluid indicated severe phase instability occurred within a day at a temperature of 240° F. Water insoluble ethoxylated aliphatic compounds having the same aliphatic group and having from 4 to 8 moles of ethylene oxide per mole of surfactant were obtained, and fluid samples were prepared using 0.5, 1.0 and 2.0 percent of each of the nonionic surfactants having 4.0, 5.0, 6.0, 7.0 and 8.0 moles of ethylene oxide per mole of surfactant. Each sample contained 2 percent of the above described alkylpentaethoxyethyl sulfonate in a field brine containing 205,000 parts per million total dissolved solids including 10,000 parts per million divalent ions. These materials were stored for seven days at 240° F., and the fluids were observed daily during a seven day period to determine whether phase stability was achieved with any of the samples. The data are included in Table I below.

TABLE I

| Number of moles of ethylene oxide in the nonionic SURFACTANT | DAYS STABLE AT 240°. Concentration of Nonionic Surfactants | | |
|---|---|---|---|
| | 0.5% | 1.0% | 2.0% |
| 4 | 7 days | 1 day | 1 day |
| 5 | 7 days | 2–3 days | 1 day |
| 6 | 1–2 days | 7 days | 1 day |
| 7 | 1 day | 7 days | 1 day |
| 8 | 1 day | 7 days | 1 day |

The above reported data indicate that phase stabilization of the 2 percent solution of the alkylpentaethoxyethyl sulfonate surfactant was achieved using 0.5 percent of the 4 mole and 5 mole ethylene oxide surfactant and 1.0 percent of the 6, 7 and 8 mole ethylene oxide nonionic surfactant.

The results reported above are surprising when it is considered that the nonionic surfactants tested are insoluble at the test conditions. It is speculated that mixed micelles were formed which imparted the observed stability to the test solutions, although this has not been verified.

In order to determine whether the phase stable solutions identified above were effective for recovering oil under the conditions of the tests, a core displacement test was performed. A linear Berea sandstone core measuring 14.9 centimeters in length and 5.08 centimeters in diameter was utilized. The porosity of the core was 19.8 percent and the permeability was 100 millidarcies. The core was saturated with crude oil and then waterflooded with oil field brine to a stable oil saturation of about 38 percent, which is typical response for such cores to waterflooding. An aqueous solution containing 2.0 percent of the $C_{16}$ to $C_{20}$ alkylpentaethoxyethyl sulfonate surfactant and 1.0 percent of the 7 mole ethylene oxide adduct of $C_{16}$ to $C_{20}$ alcohol dissolved in the same oil field brine was then injected into the core. Oil recovery increased dramatically after injection of the surfactant solution and a final oil recovery of about 95.5 percent was achieved, reducing the oil saturation in the core to a value less than about 3.8 percent based on the pore volume of the core. This is considered to be excellent recovery for these test conditions, and is substantially better than that achieved utilizing precisely the same alkylpentaethoxyethyl sulfonate surfactant without the nonionic surfactant phase-stabilizing additive. Essentially no tertiary oil recovery is achieved in the latter case because of the phase instability of the surfactant.

A second core displacement test similar to that described above was performed utilizing an aqueous solution in the same brine containing 2.0 percent of the $C_{16} - C_{20}$ alkylpentaethoxyethyl sulfonate disclosed above, plus 1 percent of a mixture of nonionic surfactants differing only in the amount of ethylene oxide, the mixture being about equally composed of 5.0 to 7.0 mole ethylene oxide adducts of the $C_{16}$ to $C_{20}$ alkanol. The final oil recovery achieved was about 89 percent and the oil saturation was reduced to about 4.1 percent based on the pore volume, again very good results.

Another series of tests were performed to investigate several aspects of oil recovery from a core displacement test essentially the same as those described above. It was desired to determine the total oil recovery obtainable with several blends of different water insoluble nonionic surfactants and alkylpolyalkoxyalkyl sulfonate or alkylarylpolyalkoxyalkyl sulfonate, employing essentially continuous surfactant injection (as opposed to injecting a single slug which is a fraction of a pore volume of the core followed by water), and to determine the pore volumes one must inject to achieve the final maximum oil recovery, and the total pore volumes of surfactant injected before the first appearance of surfactant in the effluent. For comparison purposes, the oil recovery attained after injection of one pore volume of surfactant fluid are also given. The results are tabulated in Table II below. In all three runs, the cores used were Berea Sandstone cores measuring 14.9 cm in length and 5.08 cm in diameter. The cores permeability ranged from 110–320 millidarcies. The fluids all had salinities of 189,000 parts per million total dissolved solids. The core floods were all performed at 115° C. (240° F).

first detected in the effluent appeared to be related. Relatively large surfactant volumes for achieving maximum oil recovery and for first appearance of surfactant in the effluent is indicative of increased surfactant retention in the core.

Another series of runs was made using 3 component surfactant systems. The tests were run in Berea sandstone core measuring 14.9 cm in length and 5.08 cm in diameter and having permeabilities of 259–321 millidarcies. The surfactant concentration was tapered logarithmicly in these runs. Final maximum recovery efficiency, volume of surfactant fluid injected for final recovery efficiency, pore volumes of surfactant at which surfactant first appeared, and recovery efficiency obtained at one pore volume of surfactant fluid injected, was determined for each run and the data are in Table III below.

TABLE III

ENHANCED OIL RECOVERY AND PORE VOLUMES OF SURFACTANT FLUID INJECTED

| RUN | COMPONENTS OF SURFACTANT FLUID | FINAL RECOVERY EFFICIENCY, $E_R$ (m³/m³) | PORE VOLUMES OF SURFACTANT FLUID INJECTED FOR FINAL $E_R$ | PORE VOLUMES OF SURFACTANT FLUID INJECTED AT WHICH SURFACTANT FIRST APPEARED | $E_R$ AFTER ONE PORE VOLUME OF SURFACTANT INJECTED (m³/m³) |
|---|---|---|---|---|---|
| 4 | 1.7% D  1.3% E  0.3% F | 0.84 | 0.9 | 0.8 | 0.84 |
| 5 | 1.7% D  1.3% E  0.3% G | 0.94 | 1.3 | 0.9 | 0.83 |
| 6 | 2.0% D  1.0% H  0.2% F | 0.88 | 2.6 | 3.0 | 0.48 |

SURFACTANT D: $C_{16}$–$C_{20}$ alkylpentaethoxyethyl sulfonate
SURFACTANT E: Purified linear $C_{16}$–$C_{20}$ alkyl sulfonate
SURFACTANT F: 4 mole ethylene oxide adduct of $C_{16}$–$C_{20}$ linear alkanol
SURFACTANT G: 6 mole ethylene oxide adduct of $C_{16}$–$C_{20}$ liner alkanol
SURFACTANT H: Branched aliphatic sulfonate, average equivalent weight of 400.

It can be seen that excellent recovery was obtained in all three runs and the volume of surfactant fluid required was less than in the previous runs.

A final series of runs was performed to determine the effect on fluid viscosities of an eight mole ethylene oxide adduct of a linear alkanol ($C_{16}$–$C_{18}$) in brine solutions containing dodecylphenoltetraethoxyethyl sulfonate. Five solutions of varying concentrations were

TABLE II

ENHANCED OIL RECOVERY AND PORE VOLUMES OF SURFACTANT FLUID INJECTED

| RUN | COMPONENTS OF SURFACTANT FLUID | FINAL RECOVERY EFFICIENCY, $E_R$ (m³/m³) | PORE VOLUMES OF SURFACTANT FLUID INJECTED FOR FINAL $E_R$ | PORE VOLUMES OF SURFACTANT FLUID INJECTED AT WHICH SURFACTANT FIRST APPEARED | $E_R$ AFTER ONE PORE VOLUME OF SURFACTANT INJECTED (m³/m³) |
|---|---|---|---|---|---|
| 1 | 2.0% A  0.4% B | 0.97 | 2.2 | 1.5 | 0.53 |
| 2 | 2.0% A  0.75% B | 0.98 | 4.0 | 3.0 | 0.24 |
| 3 | 2.0% C  0.5% B | 0.93 | 4.5 | 4.3 | 0.08 |

SURFACTANT A: Dodecylphenolhexaethoxyethyl sulfonate
SURFACTANT B: 6 mole ethylene oxide adduct of dodecylphenol
SURFACTANT C: Dodecylphenoltetraethoxyethyl sulfonate It can be seen from the foregoing that all three combinations were effective for oil recovery under the severe conditions of the rest. Run 1 was most effective in recovering oil and required the least volume of surfactant. The volume of surfactant required for maximum oil recovery and injection volume at which surfactant was first detected in the effluent appeared to be related.

prepared in a brine whose salinity was about 189,000 parts per million total dissolved solids. The fluids were aged at 240° F. for three days and then the viscosity of each fluid was measured using a Brookfield Viscometer at 200° F and at a shear rate of 18.9 sec$^{-1}$. The results are contained in Table IV below.

TABLE IV

FLUID VISCOSITIES, CP

| % DODECYLPHENOLTETRAETHOXY ETHYL SULFONATE | ETHYLENE OXIDE ADDUCT $C_{16}$–$C_{18}$ LINEAR ALKANOL | VISCOSITY, CENTIPOISE |
|---|---|---|
| 2.0 | 0.0 | 2.0 |
| 2.0 | 0.2 | 2.0 |
| 2.0 | 0.3 | 5.0 |
| 2.0 | 0.4 | 8.0 |
| 2.0 | 0.5 | 34.0* |

*After 6 days at 240° F. the viscosity was 7 cp.

It can be seen that adding from 0.3 to 0.5% of a nonionic surfactant increased the viscosity of the dodecylphenoltetraethoxyethyl sulfonate significantly, which would insure improved displacement efficiency in a surfactant flooding process.

While our invention has been disclosed in terms of a number of illustrative embodiments, it is clearly not so limited since many variations thereof will be apparent to persons skilled in the art of surfactant flooding enhanced oil recovery processes without departing from the true spirit and scope of our invention. Similarly, while a mechanism has been described to explain the results obtained from the use of the process of our invention, it is not necessarily hereby represented that this is the only or even the principal mechanism which is involved in application of the process of our invention, and it is not our desire or intention to be bound by any particular explanation or theory of the workings of the process of our invention. It is our intention and desire that our invention be limited and restricted only by those limitations and restrictions as appear in the claims appended hereinafter below.

We claim:

1. A method for recovering petroleum from a subterranean, permeable, petroleum-containing formation penetrated by at least one injection well and by at least one spaced apart production well, both wells being in fluid communication with the formation, the temperature of the formation being from about 70° F to about 300° F., said formation containing water having a salinity from 70,000 to 220,000 parts per million total dissolved solids, comprising:
   (1) injecting into the formation via the injection well an aqueous, saline, phase-stable surfactantcontaining fluid comprising:
      (a) a water soluble alkylpolyalkoxyalkyl sulfonate or alkylarylpolyalkoxyalkyl sulfonate having from 8 to 24 carbon atoms in the alkyl chain and from 1 to 20 alkoxy groups;
      (b) a water insoluble nonionic surfactant comprising an ethoxylated alkylaryl or an ethoxylated aliphatic compound having from 8 to 24 carbon atoms in the alkyl or aliphatic chain and containing from 1 to 20 ethoxy groups;
      (c) said surfactant fluid having a salinity from about 70,000 to about 220,000 parts per million total dissolved solids, said surfactant fluid displacing oil toward the production well; and
   (2) recovering petroleum displaced by the surfactant fluid from the formation via the production well.

2. A method as recited in claim 1 wherein the alkylpolyalkoxyalkyl sulfonate or alkylarylpolyalkoxyalkyl sulfonate surfactant has the following formula:

$$RO(R'O)_xR''SO_3^-M^+$$

wherein R is an alkyl or alkylaryl group, linear or branched having from 8 to 24 carbon atoms in the alkyl chain, R' is ethyl or a mixture of ethyl and propyl having relatively more ethyl than propyl, x is a number from 1 to 20, R" is ethyl, propyl, hydroxypropyl or butyl, and $M^+$ is a monovalent cation.

3. A method as recited in claim 2 wherein R" is ethyl.

4. A method as recited in claim 2 wherein R" is propyl.

5. A method as recited in claim 2 wherein R" is hydroxypropyl.

6. A method as recited in claim 2 wherein R" is butyl.

7. A method as recited in claim 2 wherein $M^+$ is selected from the group consisting of sodium, potassium, lithium or ammonium.

8. A method as recited in claim 2 wherein the value of x is from 2 to 8.

9. A method as recited in claim 2 wherein R is an alkyl or alkylaryl group having from 12 to 24 carbon atoms in the alkyl chain.

10. A method as recited in claim 2 wherein the water insoluble nonionic surfactant has the following formula: $R'''O(CH_2CH_2O)_yH$ wherein R''' has the same meaning as R and y is a number from 1 to 10.

11. A method as recited in claim 10 wherein y is from $(x-3)$ to $(x+3)$.

12. A method as recited in claim 10 wherein y is from $(x-2)$ to $x$.

13. A method as recited in claim 1 wherein the concentration of the alkylpolyalkoxyalkyl sulfonate or alkylarylpolyalkoxyalkyl sulfonate is from about 0.05 to about 10 percent by weight.

14. A method as recited in claim 1 wherein the concentration of the nonionic surfactant is from about 0.05 to about 10 percent by weight.

15. A method as recited in claim 1 wherein the concentration of the alkylpolyalkoxyalkyl sulfonate or alkylarylpolyalkoxyalkyl sulfonate in from about 0.1 to about 5.0 percent by weight.

16. A method as recited in claim 1 wherein the concentration of nonionic surfactant is from about 0.10 to about 5.0 percent by weight.

17. A method as recited in claim 1 wherein the salinity of the surfactant solution is about equal to the salinity of the formation water.

18. A method as recited in claim 1 wherein the surfactant fluid also contains from 0.1 to 10% by weight of an organic sulfonate anionic surfactant.

19. A method as recited in claim 18 wherein the organic sulfonate is petroleum sulfonate, alkyl sulfonate, alkylaryl sulfonate, or a mixture thereof.

* * * * *